2,961,528

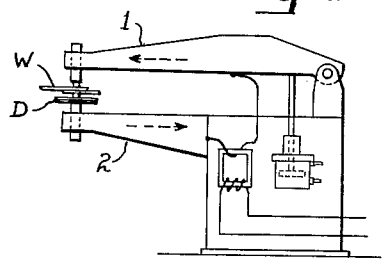
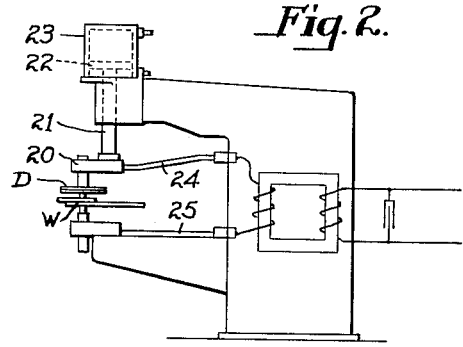
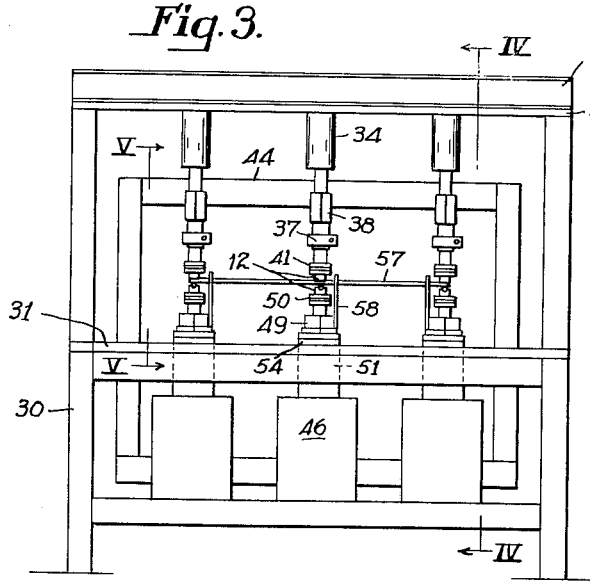
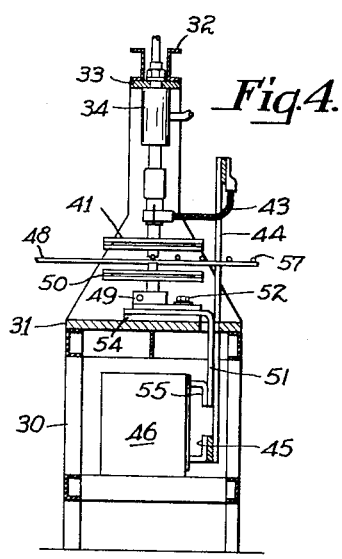
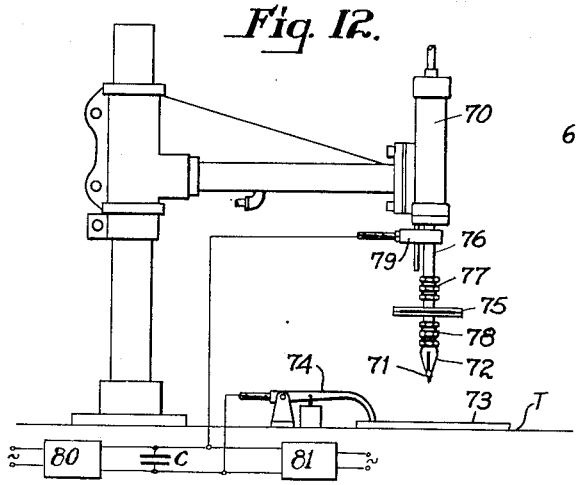
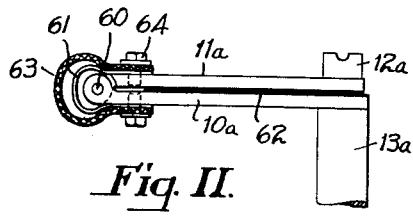
INVENTOR.
Charles R. Dixon Nov. 22, 1960   C. R. DIXON   2,961,528
ELECTRIC WELDING APPARATUS
Filed Dec. 24, 1958   2 Sheets-Sheet 2
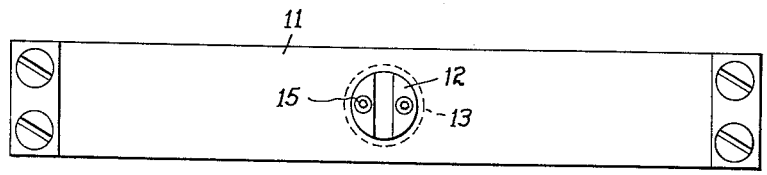
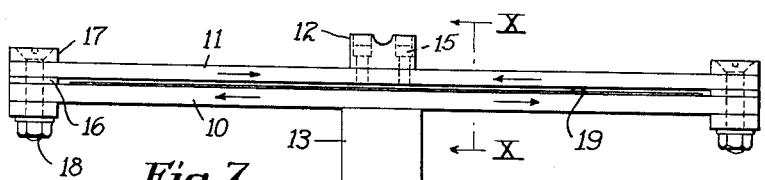
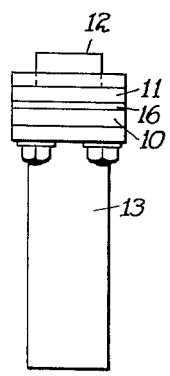
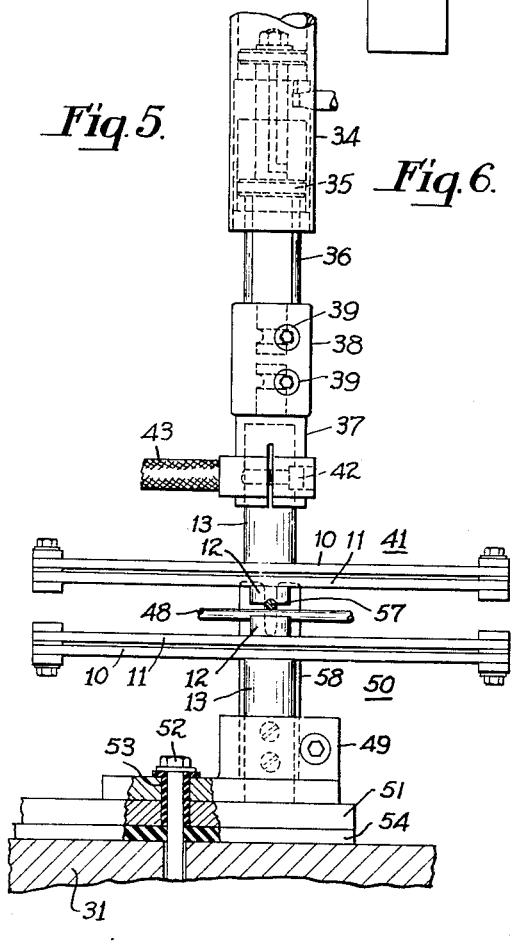
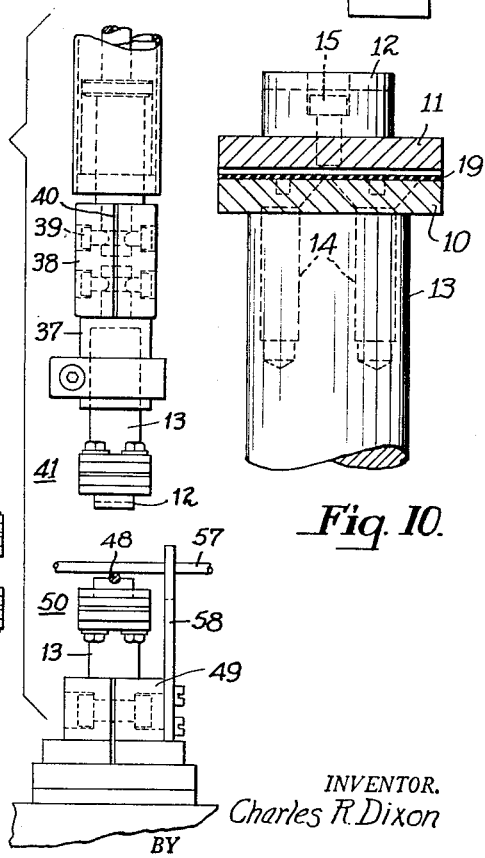
INVENTOR.
Charles R. Dixon
BY
Howard B. Funk
ATTORNEY

United States Patent Office 2,961,528
Patented Nov. 22, 1960

ELECTRIC WELDING APPARATUS

Charles R. Dixon, New Kensington, Pa., assignor to Aluminum Company of America, Pittsburgh, Pa., a corporation of Pennsylvania Filed Dec. 24, 1958, Ser. No. 782,886

2 Claims. (Cl. 219—98)

This invention relates generally to electric welding and more particularly to apparatus for electric welding with electro-dynamic control for regulation of welding pressure conditions.

The invention is shown in the drawings as employed in various forms of spot and stud welders to provide electromagnetic acceleration and pressure control for the welding electrodes thereof, but it will be understood that it can be employed in connection with other types of welders.

In some spot welders, usually of the rocker arm type, it is known that harmful repulsive forces which tend to cause what is known as electrode separation or lift are developed at the time of welding, thereby impairing the usefulness of such welders for some welding tasks.

It is an object of my invention to provide a simple device for use on such welders to counteract and eliminate the effects of electrode lift and provide a more uniform electrode pressure on the weld load.

Other welding machines, known as the press type and provided with an electrode moving mechanism actuated by various types of power, but usually compressed air, are extensively used in the art. During a welding operation, particularly in the case of welding some materials requiring the use of a high magnitude of welding current for a short time of which the welding of aluminum is a notable example, the moving mechanism is required to effect electrode acceleration and follow-up movement in order to accommodate for the rapid softening of the work parts and the set-down thereof into each other. While this movement is small, it must take place in a very short time of a few milliseconds, in some cases. Because of inherent acceleration limitations of the electrode moving system, due to inertia and friction and other causes, the electrode motion lags the current rise, though often only to a slight extent, so that the welding pressure drops momentarily and the contact resistance increases, thereby tending to develop too intense heat and insufficient pressure at the welding zone which contribute to and frequently cause excessive spitting and arcing with consequent impairment of the weld area and possibly a burning through or rupture of the work parts. Even with carefully adjusted machine settings, the weldability of some metals and alloys is reduced to a poor or a difficult to weld classification and can be welded only over a narrow range of machine settings with considerable variation in weld quality and strength when repetitively produced under production conditions.

In the operation of percussion welding equipment, the problem of getting the molten or fused surfaces of the work pieces into contact at the proper time to complete the weld is difficult to overcome due to the rapid heating by the arc which is established between the work pieces before the percussive contact is made. High velocity travel of one of the electrodes and the work piece it engages is required with the result that a harmful bounce condition is introduced at the time of contact or impact of the work pieces with each other. Often, a usable correlation between fusion of the work surfaces and the time of bringing them together to make a weld can be established only by critical adjustment of machine settings over a limited range. A difficulty is that those settings are easily disturbed and changed by ever-present commercial variations in conditions which lead to undesired weld quality variations under production conditions and occasional "duds" in the case of stud welding. The present invention eliminates these difficulties.

Moreover, it has been found to be quite difficult to make essentially a spot weld in such a set-up as exemplified by cross-wire welding wires or rods of aluminum alloys and other metals in the production of welded wire products such as wire mesh, racks, shelves, baskets and the like; especially with wires or rods made from aluminum conductor metal designated EC aluminum alloy. Heretofore, cross-wire welds of such materials have not been consistently produced by use of conventional welders due principally to the inability of the electrode moving system to respond quickly enough and provide the electrode acceleration and follow-up needed to accommodate for the rapid softening of the crossed wires and the necessary considerable set-down thereof into each other. Extremely short welding time is required, one-half cycle of a sixty cycle current supply being a typical welding time employed for welding aluminum alloy wires of one-quarter inch diameter or less, with a set-down ratio between the unwelded and the welded thickness of the wires of about twenty percent minimum for adequate weld area. This imposes a tremendous acceleration burden on the electrode moving system which is aggravated by any extraneous inertia and friction. Use of higher initial electrode force is not feasible because of excessive initial indentation of the crossed wires, lack of fusion at the center of the weld area and the danger of subsequent shearing of the soft wire at welding temperature, particularly the smaller wire when welding wires of different diameters. Resilient pressure followers as sometimes used in the electrode moving system have not proved adequate. The result of ineffectual electrode acceleration is a temporary excessive drop and sometimes loss of contact or welding pressure between the electrodes and the work leading to a weak weld or to spitting and arcing with damage to the electrodes and work and blowing out of molten metal between the interface and no weld at all. The present invention eliminates these disadvantages.

Special welding machine constructions incorporating complicated electromagnetic facilities and arrangements have heretofore been proposed in order to give some degree of electrode pressure control, but only at the expense of greatly increased construction and maintenance costs.

It is another object of the invention, therefore, to provide a simple and effective electro-dynamic device which is easily and readily installed on any conventional welding machine without costly modifications and which electrically effects electrode acceleration and pressure control and offsets the effects of lag or sluggishness in the electrode moving system.

Another object is the provision of an electro-dynamic force device of simple, novel and effective form which constitutes a terminus of an electrode moving mechanism of a welding mechanism and serves as an electrode carrier and force controller.

Still another object is to provide an electro-dynamic welding electrode force control device for automatic timing and regulation of welding force and/or post welding forging pressure on the work controlled by current flow therethrough.

Yet another object of the invention is to simplify and improve generally the structure and operation of welding apparatus incorporating magnetic force electrode control means in the practice of resistance and percussion welding and the like and to obtain thereby strong, high quality welds repetitively under production conditions.

A fuller understanding of the nature and advantages of the invention will be apparent from the following detailed description taken in conjunction with the accompanying drawings, wherein:

Fig. 1 is a schematic elevational representation of one type of welder incorporating the present invention;

Fig. 2 is a similar view of another type of welder incorporating the invention;

Fig. 3 is a front elevational view of a cross-wire welding machine having three welding heads or stations and showing the invention applied thereto;

Fig. 4 is a cross-sectional view on line IV—IV of Fig. 3;

Fig. 5 is a side elevational view on an enlarged scale of a portion of the machine of Fig. 3 looking in the direction of the arrowed line V—V and showing the mechanism in greater particularity;

Fig. 6 is a front elevational view of the mechanism of Fig. 5, but showing the upper electrode in raised position;

Fig. 7 is a front elevational view of one embodiment of the electro-dynamic electrode carrier and control device of the invention as it appears detached from a welder;

Fig. 8 is a plan view of the device;

Fig. 9 is an end view of the device;

Fig. 10 is an enlarged sectional detail view taken on the line X—X of Fig. 7;

Fig. 11 is a view similar to Fig. 7, but showing a modification, and

Fig. 12 is an elevational view of a stud welder incorporating the invention.

In the drawings, Fig. 1 illustrates a conventional rocker arm welder. Through the relatively movable throat arms 1 and 2 and the opposed electrodes carried thereby the welding pressure and welding current are applied to the work parts W to spot weld them. As indicated by the arrows, the welding current flows in opposite directions through the conducting arms 1 and 2. Thereby, electromagnetic forces of repulsion are developed on them and they will move apart and cause electrode lift with respect to the work and decrease in the pressure exerted on the work. In addition, the relatively slow electrode follow-up by its moving mechanism during the welding operation to accommodate for softening and set-down of the work pieces causes a further untimely reduction in the pressure. Both effects produce undesired and harmful changes in the welding conditions, sometimes resulting in weld impairment, excessive heating and possibly burning of the electrode tips and of the work pieces and restriction of the usefulness of such welder for some welding tasks.

The disadvantages inherent in this type of welder, however, are overcome by the present invention by making use of electromagnetic forces of repulsion due to current flow through opposed conductors in opposite directions in an electro-dynamic force device of simple construction. This device is indicated at D in Fig. 1 and the construction of an effective form thereof is shown in Figs. 7 through 10. It comprises a pair of resilient conductor bars 10 and 11, in opposed, substantially parallel relation and integrally or otherwise joined at their ends, an electrode 12 and a metal mounting member or post 13 secured to the bars 10 and 11, respectively, at opposite outer sides thereof and substantially midway of the length of the bars so that the bars extend substantially symmetrically radially outwardly in opposite directions from the post. The post 13 is of a shape and size corresponding to the usual electrode holder of a welding machine, it being a feature of the invention that the electrode holder will merely be removed from its customary support or receiver, usually termed a horn or arm, and the present device installed in place of the electrode holder yet operate automatically responsively to flow of the welding current therethrough to control the welding or contact pressure.

The bar 10 preferably is abutted against one end of post 13 and secured in position, as by means of screws 14, or by hard soldering or brazing. The electrode 12 is secured to the other conductor bar 11 preferably substantially in line with the post. Thereby, high welding and/or forging forces or pressures may be imposed thereon without subjecting the conductor bars to an excessive bending couple. Preferably, the electrode is removably attached to the conductor bar 11, so that an electrode having the desired customary tip contour and length may be readily mounted, as required; the electrode illustrated in Figs. 7–10 being of a button type and grooved for wire welding. As shown, screws 15 threaded into bar 11 removably attach the electrode to the bar.

While the bars may be of various cross-sectional shapes and various metallic materials, they preferably are of generally rectangular section and may simply be cut to predetermined lengths from rectangular electrical conductor bus-bar stock. Disposed broadside or in face-to-face relation and with the post and electrode mounted on their outer faces as above described, the two bars 10 and 11 are normally held apart in close-spaced relation by a thin metallic washer or spacer 16 interposed therebetween at each end, thereby providing a substantially uniform thickness air gap transversely and longitudinally of the bars. The bar spacing and hence the air gap thickness is less than the thickness of either bar to provide effective magnetic field reaction between the bars. Clamping means in the form of clamp plates 17 on the outer sides of the bars at each end and bolts 18 passing therethrough serve to electrically and mechanically connect the bars to each other at their ends. A shim 19 of insulation material, such as mica, impregnated cambric or paper or the like, is provided between the conductor bars in the air gap to prevent short-circuiting contact therebetween when pressure is transmitted through the bars. Preferably, insulation shim 19 extends substantially the full length of the air gap. It may be loosely positioned in the air gap, since it frictionally will remain in position therein, or it may be suitably adhered or glued to the face of one of the bars. It is sufficient to cover only one of the opposed faces of the bars to prevent short-circuiting, but its entire periphery, or of both bars, may be insulatedly covered, if desired.

With reference to Fig. 7, it will be seen that welding current can flow between electrode 12 and post 13 only by dividing and flowing radially outwardly in one conductor bar and radially inwardly in the other conductor bar, as indicated by the arrows. Thus, the current flow through the opposed bars 10 and 11 is in opposite directions, and in consequence, electromagnetic forces of repulsion are developed on these bars throughout their lengths which urge them away from each other. Being confined or interconnected to each other only at their ends, the bars arch or flex elastically away from each other under the influence of the repulsive forces, thereby forcing the electrode 12 axially away from post 13. The result is that the device D becomes a useful tool that is easily installed on a welding machine and which acts electro-dynamically independently of the electrode moving system of such welders to provide substantially instantaneous electrode acceleration and advancing movement for controlling and timing the application of the welding force or pressure.

It can be shown mathematically, and it is well known in the electrical art, that the repulsive forces developed on facing rectangular conductor bars considered as rigid bodies (for oppositely directed currents) are functions of current and bar spacing, width, length and permeability of the bar material. By customary design procedures, the device D can be designed to produce the desired force on its electrode for a given welding current, which force changes automatically and substantially proportionally and instantaneously with current changes. The bars are resilient members (with respect to force applied perpendicular to their wide faces as is herein the case), as distinguished from being flexible members, in order that the increments of forces of repulsion developed along the length thereof will not merely be locally absorbed, but will be cumulatively transmitted to and aggregated at the post and the electrode to produce electrode advancing force. As a typical example, the bars 10 and 11 may be made from rectangular, copper conductor bar stock generally one-quarter inch thick, one and three-quarter inches wide and twelve inches long, and having a one-sixteenth inch air gap therebetween. By choice of dimensions and materials, to take advantage of their permeabilities, for the conductor bars, the desired electrode advancing force and the extent of electrode movement can be obtained for satisfying the requirements of various welding operations.

Referring now to Fig. 1, the bottom electrode holder has been replaced by an electro-dynamic force device D of the construction above described, but the upper electrode holder could have been replaced, if desired. Upon operating the welder in usual fashion to spot weld the work part W, the harmful electrode lift and pressure drop inherent in the welder due to the current flow through throat arms 1 and 2 is counteracted by the electrode-advance due to the flow of the same current through the bars 10 and 11 of the control device D, as heretofore described. These oppositely acting forces develop simultaneously (being due to the same current). In addition, the effects of electrode lag inherent in the electrode moving mechanism of the welder are eliminated by the control device since the electrode-advance thereof is created by the welding current flow therethrough substantially concurrently with the rise in current. The result is that electrode pressure drop on the work is eliminated, thus contributing to the making of uniform and consistently stronger welds, whatever the throat depth of the welder may be.

For illustration purposes in Fig. 1, the control device is shown with ith conductor bars extending lengthwise of the throat arms, whereas in practice its bars are preferably oriented transversely of or in right angle relation to the throat arms so as to minimize the magnetic field effects between the arms and the bars which would otherwise tend to create neutralizing force effects on the bars of the control device.

In Fig. 2, a typical press type spot welder is represented with electro-dynamic force control for the welding pressure to compensate for the acceleration lag in the movable electrode actuating mechanism. Here again for illustration purposes, the control device D of the above described construction is shown mounted in the upper electrode holder receiver 20 forming a part of the electrode actuating mechanism which includes a carrier slide or plunger 21 and piston 22 operating in the double-acting air cylinder 23, with the bars of the device D 90° out of preferred position; but the device could have replaced the bottom electrode and its holder. The welding current is supplied to the upper and lower receivers for the electrode holders through the usual flexible conductor 24 and bar conductor 25, respectively. Since the invention does not reside in the welder construction, nor in the energy supply and controls, the details thereof are not illustrated and described.

As above discussed, the electrode moving mechanism cannot provide the necessary electrode acceleration and follow-up movement without momentary lag and drop in welding or contact pressure that adversely affects the welding conditions. Acting independently of such mechanism, the electrode accelerator or pressure control device D eliminates this difficulty. Electromagnetic force action on the opposed bars 10 and 11 thereof due to the high amperage welding current flow therethrough causes the electrode-advance. The magnetic field and resultant separating force on the bars build up instantly with the current since the circuit through the bars is practically non-inductive, thereby avoiding electrical lag. The separating force on the bars provides substantially concurrent increase of electrode pressure on the work owing to the small mass and inertia of the electrode 12. The electrode force, of course, is dependent on the current, but changes in its magnitude remain substantially in phase with and proportional to changes in current magnitude. Thereby, more uniform welding conditions with respect to pressure, resistance and rate of heat input prevail at the welding zone during the welding cycle. Accordingly, it is feasible to press the work pieces together under much lower initial squeeze pressure for higher contact resistance and greater rate of heat input at the start of the welding cycle with assurance that the relations or conditions will be maintained automatically, thereby reducing the danger of metal expulsion and burning, and increasing the scope of application and usefulness of the welder. A further advantage resides in the use of the device for the application of either steady or vibrating forging forces to the weld area, as desired.

A three station cross-wire welder is illustrated in Figs. 3-6. It suitably comprises a frame 30 having a table 31 and an overhead support comprised of laterally spaced beams 32 and a longitudinally slotted bottom plate 33 dependent from which the upper movable welding heads of each station are supported to cooperate with lower electrodes carried by table 31. The elements of each station are duplicates, so a description of one station applies to the others. The upper welding head comprises an air cylinder 34 which may be of a double bore type, as illustrated, for space saving and provided with tandem connected pistons 35, the piston rod 36 of which extends slidably through the cylinder bottom and has a flat surface portion to prevent its rotation. A socket member 37 is secured to the lower end of the piston rod by means of an insulation coupling 38, all in solid axial abutting relation for transmission of welding pressure. Suitably, the socket member 37 and the piston rod may have reduced ends inserted in a through bore in the coupling and clamped by means of clamp screws 39, the coupling being axially split at 40 to permit the clamping action. An electrode accelerator or force controlling device 41, of the construction above described, is carried by the socket member 37, the post 13 of device 41 being inserted in the socket of member 37 and clamped therein, as by means of clamp screw 42. A flexible cable 43 electrically connects the socket member 37 to a common bus bar loop 44, which loop is insulatedly supported in an upright position rearwardly of the welding stations by the frame 30 and its lower bar is connected to one terminal 45 of each of the three welding transformers 46 supported below table 31. The loop 44 provides a window through which the welded wire product may extend without interference and enables delivery of the welding current to the upper welding heads expeditiously in their various positions of lateral placement conforming to the spacing desired for the longitudinal wires or rods 48 of the wire product.

A bottom socket member 49, coaxial of the upper member 37, may be provided with a conventional electrode holder and electrode, but is here shown with a duplicate electrode accelerator device 50 so that the range of movement of the opposed cooperating electrodes 12 of the two devices will be doubled and thus more easily take care of the considerable wire set-down motion during welding. The socket member 49 seats on a conductor bar 51 and the two are suitably clamped together and to the table 31 by means of bolts 52, only one showing in Fig. 5, bushing 53 for each bolt and pad 54 under bar 51, both of insulation material, serving to isolate the socket member and its current conductor bar 51 electrically from the table. Conductor bar 51 extends down through an opening in the table and is connected to the other terminal 55 of its welding transformer. Each of the bottom socket members of the other welding stations is similarly connected to its own transformer. Individual controls, not shown, for each welding station may be provide to permit either the simultaneous or the cascade welding at the welding stations, the latter being preferred since it greatly reduces the electrical load on the power supply system. Conventional controls may be used, and likewise for effecting the vertical reciprocation of the upper welding heads.

For cross-wire welding, each accelerator device 41 and 50 is provided with a small mass, button form of electrode 12, face grooved, as shown, to embrace about half the diameter of the wire it engages. The grooves of the lower electrodes receive the longitudinal wires 48, while the grooves of the upper electrodes engage the cross wire 57 and thus are angularly oriented relatively to the grooves of the lower electrodes in accordance with the angle of crossing of the wires. The crossing angle is at 90° as herein shown to produce a rectangular mesh, but it may be at a different angle to make a diamond mesh, for example. To hold the cross wire 57 in line with the upper electrode grooves until engagement is made therebetween by descent of the upper welding heads, upstanding supports 58 of insulation material are provided and secured either to the table 31 or to each of the lower socket members 49 in position to receive the cross wire in a vertical, open-end slot formed in the top portion of each support 58.

In operation, the longitudinal wires 48 are placed in the grooves of the respective lower electrodes and a cross wire 57 put on top and held by the slotted supports 58, whereupon the upper heads are lowered by their actuating cylinders to engage the cross wire in the groove of the top electrodes and put initial squeeze pressure on the wires at each crossing point to be welded. Relatively low squeeze force is applied in order to avoid excessive initial indentation of the wires and the danger of subsequent shearing of the soft wires at welding temperature by impact of the upper head against them, particularly when for example a ⅛ inch diameter wire is being welded to a ¼ inch diameter wire, both of EC aluminum alloy. Such material has been practically impossible to cross-wire weld heretofore for the reasons above pointed out. However, when the high amperage welding current impulse, usually of one-half cycle duration, is passed through the crossed-wire joint to produce the welding heat, it also flows through the bars of the electrode accelerators and substantially instantly accelerates the electrodes towards each other in unison with the current rise and rate of heating. The small mass and inertia of the electrodes contribute to this rapid follow-up motion. Force and current sufficient to produce a percentage setdown of the wires into each other of between about 20 and 80% will generally be provided for cross-wire welding of various metals so as to procure an adequate weld area without excessive reduction in wire cross-section and strength. Even though the distance of electrode travel is relatively great owing to this percentage set-down, experience shows that neither loss of contact nor loss of welding pressure occurs and sound, clean welds are repetitively produced that are substantially free from cracks and porosity. Percentage set-down is defined as being equal to the ratio of the sum of the diameter of the wires before welding minus the sum after welding, divided by the diameter of the smaller wire, or of one of them if of equal diameter, times one hundred; i.e., .375−.330/.125×100 for ¼ and ⅛ inch wires with a percentage set-down of 36% (.045 inch). A percentage set-down of about 25% minimum is needed for adequate weld area and strength for wires or rods of EC aluminum alloy. Substantially the same results are obtained by electromagnetically controlling either one or both of the electrodes. Thus, use of the electrode accelerator provides the necessary electrode motion and pressure control in a simple manner and converts an otherwise difficult or practically impossible welding task into a successful operation for hard to weld materials.

The force developed on the electrode by the current flow through the opposed conductor bars of the accelerator and pressure control device may be substantially doubled by causing all the current to flow through an undivided current path created simply by leaving the bars unconnected and insulated at one end. A modified form of control device employing a single current path is shown in Fig. 11 and comprises the two opposed, facing bars 10a and 11a, radially disposed with respect to electrode 12a and post 13a which are suitably secured thereto, respectively, at one end substantially in aligned relation. At the outer end, the bars are interconnected mechanically by means of a hinge joint formation, including a pivot pin 60, and are embraced by a spring clip 61 of hair pin shape which serves to hold them yieldingly in a "closed" position substantially parallel to each other. An insulation shim 62 adhered to the opposing face of one of the bars separates them in close-spaced relation in their closed position and avoids short-circuiting. A flexible conductor 63 electrically interconnects the bars around the mechanical joint, and both the ends of this cable and spring clip 61 may be clamped to the bars by means of bolts 64. The pivotal interconnection allows the use of rigid bars and their separating movement to advance the electrodes under the influence of the electromagnetic forces of repulsion developed on the bars by the opposite direction current flow therethrough. In addition, the device can be installed on a welder with its bars oriented in forward relation with respect to the current feeder conductors, as well as in angular relation thereto, for minimum magnetic field intercoupling effects between the bars and the feeder conductors.

In the (percussion) welding art, it is known, for example in U.S. Patent No. 2,518,463 to Graham, to weld studs to a work piece such as a sheet by the application thereto of an electrical energy impulse from a condenser and a mechanical impact blow, with the stud provided with a special fusable tip to cause formation of an arc slightly before the stud impacts against the surface of the sheet. A welding device for this stud welding is illustrated in Fig. 12. It includes a pneumatically actuated welding gun or actuator 70 having a reciprocable piston (not shown) of the type, for example, similar to that disclosed in U.S. Patent No. 2,610,278 or 2,644,068 to Graham. By operation thereof, a stud 71 held in a chuck type electrode 72 on the gun is driven at high velocity into pressure or percussive contact with the surface of work piece or sheet 73 that is held by clamping electrode 74 on the table T. The tip on the stud initiates the current flow and fuses to initiate the arc for superficial fusion of the end of the stud and the area of the sheet directly opposite it, followed by physical contact of these areas, after the stud has traversed the arc gap distance, for completing the welding operation, all as more fully described in the patents referred to.

It has been found especially advantageous to employ an electrode accelerator 75 on the welding gun interposed, as shown, between the electrode 72 and the piston rod 76 of the gun 70. The accelerator is similar to that shown in Fig. 7, but having shorter and thinner section bars for increased resilience and amplitude of electrode advance and of magnetic material for increased permeability and consequently greater magnetic force repulsion effect. The accelerator, for facile installation, may be provided with a post on each of its opposed bars which conveniently may be connected to the lower end of rod 76 and to the electrode 72, respectively, as by means of couplers or connectors 77 and 78. Member 79 clamped on rod 76 serves as an electrical terminal for electrode 72. A power condenser unit C, adapted to be charged with direct current from a suitable A.C. source through a conventional charging unit 80, is connected in circuit with terminal member 79 and clamping electrode 74.

In operation, the stud tip initiates an arc when the gap separating the end of the stud from the sheet at least equals the tip length and the accelerator functions automatically, due to the current flow through its opposed bars, to effect an advance or forward motion of the electrode and stud conformably and synchronously with the rise in magnitude of the welding current impulse. This electromagnetic advance of the stud is, of course, independent of its motion by the welding gun and, taking it into account, permits of stud travel through the separating gap at a considerably lower velocity than has heretofore been possible. Thereby, the arc is stabilized by the relative reduction in gap length and the fused surfaces are brought together at precisely the correct time to complete the weld by the concurrent action of the welding gun 70 and the accelerator 75 without harmful rebound or bounce. In fact, the accelerator serves to absorb some of the impact energy and reduce bounce. Effective compensation is thus provided for critical operating relationships otherwise normally prevailing in the stud welding operation. The results realized, as determined by comparative tests, include an increase in the average strength of stud welds of from about 5% to 10%, with a marked improvement in consistency of the strength of the welds from about 12% to 22%, depending on the alloy of aluminum sheet to which the studs were welded (the studs being Navy type, of 4043-0 aluminum alloy, nominal 3/16" diameter, with cylindrical projections .046" to .050" long). The improvement in physical properties is further accompanied by elimination of cracks in the weld area, as determined by metallographic examination of weld sections; minute cracks can be discovered only when section is magnified 100 times. At the same time, the occurrence of an occasional "dud" or non-welded stud is eliminated.

Use of the accelerator is contemplated for percussion stud welding in a manner which eliminates the need for specially formed, arc starting tips on the studs. In this case, a high frequency generator 81, which may be of a conventional spark-gap, electronic oscillator or induction coil type, is connected across the welding circuit, as shown in Fig. 12, to superimpose a low-current, high voltage arc starting impulse on the welding circuit. The generator unit may be designed to provide a half cycle impulse or a series of impulses, as desired. The high frequency energy is made such that it will jump a predetermined length of air gap between the surface of the sheet and the end of a stud as the stud approaches the sheet and thereby strike an arc across the air gap. When this occurs, flow of power current from the condenser C takes place to effect superficial fusion of the end of the stud and the area of the sheet directly opposite it before percussive contact therebetween takes place. The power current flow through the accelerator moves the electrode and its stud forwardly in the arc gap so that the fused surfaces will be brought together without rebound at precisely the correct time to complete the weld by the concerted action of the electrode moving mechanism and the accelerator.

It is to be understood that the detailed disclosure of the invention is for understanding and illustration of the nature thereof and that such changes as may be needed to adapt it to various welding conditions and uses will be apparent to those skilled in the art and may be made without departing from the spirit and scope of the invention as defined in the appended claims.

What is claimed is:

1. A stud welding mechanism having a stud receiving chuck, fluid pressure actuated means including a piston rod for bodily advancing said chuck and providing pressure contact between the end of a projecting stud carried by the chuck and the surface of a work piece to which the stud is to be welded, said stud having a fusible tip on said end thereof for initiating current flow and arc formation when the gap between said stud end and work piece at least equals the length of said tip for superficial fusion of the opposing surfaces of the stud and the work piece before said contact is established, an electro-dynamic thrust device for effecting advance of said chuck and relative reduction of said gap length independently of its motion by said fluid pressure actuated means, said device comprising two generally rectangular, resilient conductor bars of magnetic material facing broadside to each other in spaced, substantially parallel relation and rigidly joined to each other at both ends thereof for resilient relative separating movement from each other intermediate their ends, the space between said bars being less than the thickness of a bar, said piston rod and said chuck being connected substantially in aligned relation to the outer faces of said bars, respectively, substantially midway of the length of the bars, and means for electrically connecting a source of electrical energy of high amperage and short duration to said work piece and to the piston rod side of said thrust device in series circuit relation, whereby said thrust device is actuated by electromagnetic forces of repulsion developed on said conductor bars responsively to the opposite direction current flow therethrough, said fluid pressure activated means and said thrust device cooperating to bring said fused surfaces together at relatively low impact velocity so as to minimize rebound.

2. A stud welding mechanism having a stud carrying electrode, actuating means for advancing said electrode at a velocity which provides physical pressure contact without appreciable rebound between the end of a projecting stud carried by the electrode and the surface of a work piece to which the stud is to be welded, a welding circuit including a power condenser operatively connected to said electrode and said work piece, electrical means connected across said welding circuit for impressing a low-current, high voltage impulse thereon effective to initiate formation of an arc and power current flow from said condenser between the end of said stud and the work piece through an arc gap of predetermined length for effecting superficial fusion of the opposing surfaces of the stud and work piece before said pressure contact is established, a thrust device forming a terminus of said actuating means and carrying said electrode for moving the electrode and said stud forwardly in said arc gap in concert with their motion by said advancing means, said device comprising a pair of opposed, close-spaced resilient conductor bars extending radially outwardly from said electrode and joined at their outer ends and disposed for relative separating movement in the direction of the axis of said electrode, said thrust device being electrically connected in series circuit relation in said welding circuit, whereby it is actuated by electromagnetic forces of repulsion developed on said conductor bars responsively to the flow of the power current in opposite directions through said conductor bars thereof and said fused surfaces brought together without harmful rebound.

References Cited in the file of this patent

UNITED STATES PATENTS 2,863,986    Mecklenborg _____ Dec. 9, 1958